E. C. MANNING.
AUTOMOBILE BODY.
APPLICATION FILED SEPT. 18, 1914.
1,162,940.
Patented Dec. 7, 1915.
2 SHEETS—SHEET 2.
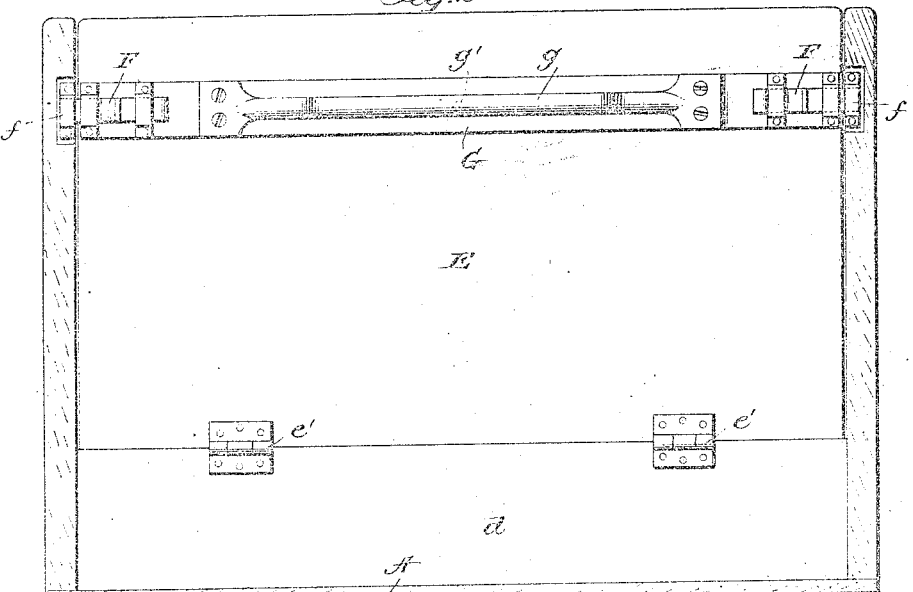
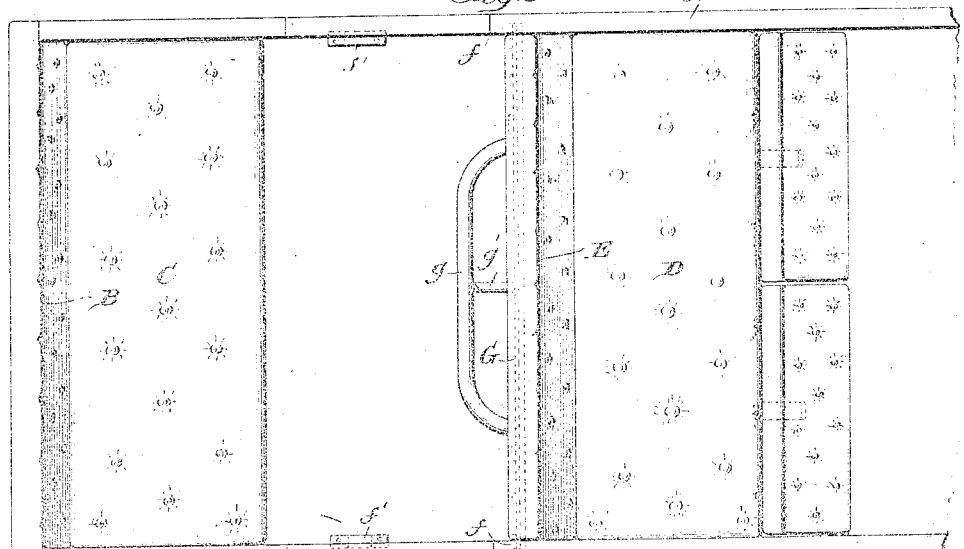
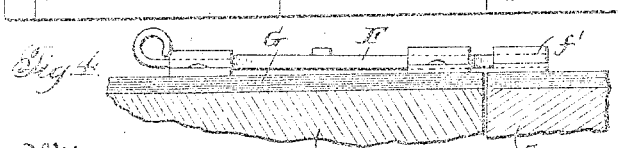
Witnesses:
Jas. E. Hutchinson
G. Wedemeier
Inventor:
Edwin C. Manning
By Bacon & Milans, Attorneys

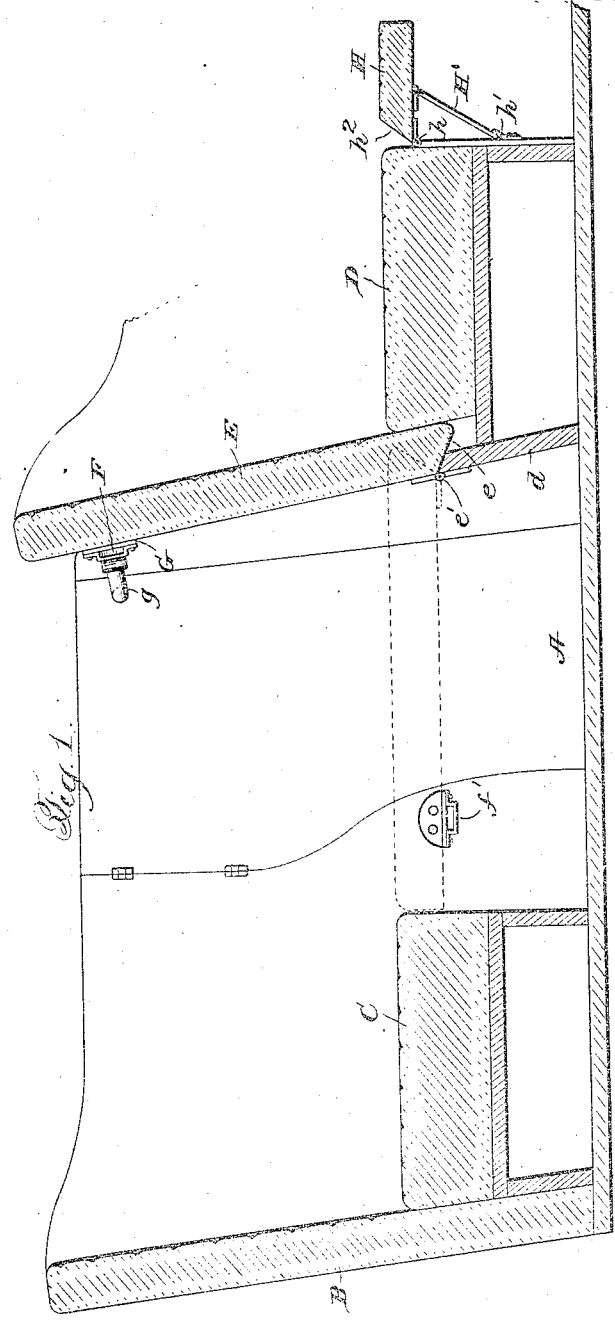

UNITED STATES PATENT OFFICE.

EDWIN C. MANNING, OF WINFIELD, KANSAS.

AUTOMOBILE-BODY.

1,162,940.  Specification of Letters Patent.  Patented Dec. 7, 1915.

Application filed September 18, 1914. Serial No. 862,330.

*To all whom it may concern:*

Be it known that I, EDWIN C. MANNING, a citizen of the United States, residing at Winfield, in the county of Cowley and State of Kansas, have invented certain new and useful Improvements in Automobile-Bodies, of which the following is a specification, reference being had therein to the accompanying drawing.

This invention relates to improvements in automobile bodies, and more particularly to an improvement wherein the seats of the body may be positioned substantially horizontally for use as a couch or bed, when desired.

While the invention is designed as an improvement in automobile bodies, it is to be understood that features thereof may be applied to other vehicle bodies.

The object of the invention, primarily, is to so construct the front seat of an automobile that its back part can be lowered, and properly supported in a position to constitute an extension of the back seat and the front seat, and thereby represent a couch for use when desired. In the usual automobile body structure, the distance between the front and back seats is approximately five (5) feet, from the rear edge of the latter to the forward edge of the former.

The present invention contemplates, also, the addition, at the front, of a movable extension, representing conveniently a member of a width approximately twelve (12) inches, which, when used in conjunction with the other parts, for couch purposes, will represent an aggregate surface of six (6) feet. Of course the proportions may be varied.

While, in the accompanying drawings, there is shown an embodiment of the invention, it is to be understood that many details can be changed and features added without departing from the general nature and spirit of the invention.

In the drawings:—Figure 1 represents, somewhat diagrammatically, a longitudinal vertical section through the center of the car body; Fig. 2 is a cross section through the center of the body showing the back of the front seat in elevated position, parts being broken away; Fig. 3 is a top view, and Figs. 4 and 5 are detail views.

In the drawings, the main body part of the machine is represented at A; B represents the back of the back seat, which is usually cushioned, and C the bottom or seat cushioned part.

D represents the front seat cushion, and d the partition between the front and the rear part of the body, the same extending across and connecting the sides of the body in the usual way.

E represents the cushioned back of the front seat, the same having conveniently its lower edge beveled or inclined as at e. This downwardly projecting inclined part e normally occupies a position below the top of the cross partition and directly to the rear of the cushion of the front seat, for purposes presently to be stated.

The back of the front seat is hinged, as at e', to the partition d, hinges being placed on the rear so that the back may be lowered in the position shown in dotted lines, Fig. 1. The plane of the hinge with reference to the back seat cushion is such that when the back E is lowered, its uppermost surface will be level with the upper surface of the back cushion, as well as the upper surface of the front cushion, thereby forming a continuation of the two cushions and occupying the space therebetween. To maintain this hinged back part in its lowered, as well as in its upright position, conveniently, sliding bolts F are employed, secured in suitable shackles on the back, the protruding ends of the bolts being arranged to enter sockets f in the sides of the body, and to thereby sustain the back in its upright position. When the back is in its lowered position, these projecting ends of the bolts are extended into sockets or above lugged plates on the sides of the body part, as at f'. To add the necessary rigidity to the upper edge of the hinged back, a metallic strap G is extended across the same, and this strap is provided with a truss member g, extending outwardly at its central portion, constituting, in addition to its trussing feature, a suitable support for coats and rugs. The truss has by preference a central strut g', for bracing the center of the back. When it is desired to lower the back all that is necessary is to withdraw the bolts and swing the back down to the position shown in dotted lines, the lower inclined edge part of the back, as at e, serving to substantially fill the gap between the same and the rear edge of the front cushion, while, owing to the position of the hinge with reference to the lower projecting edge of the back, the same may be lowered without disturbing the seat cushion. The back, in its lowered position, is properly supported conveniently from the sides, as described, and in conjunction with the front and rear seat cushions, constitutes a couch.

As above indicated, it has been found that the entire length of the couch, formed as described, is not sufficient for the average person, and I, therefore, provide at the front of the front seat cushion, a drop rest for the feet. This drop rest is represented at H and comprises conveniently, two members independently operable, so that one can be used, while the other is out of use. Each rest is provided with a hinge, $h$, secured to the vertical wall of the front seat in any convenient manner, and has also connected, adjacent its forward edge, a pivoted supporting bar H'. This bar is of a length to fold upwardly against the bottom part of the drop rest, and its lower edge is shaped to fit in a socket $h'$, formed on the front wall of the seat. When the rest is elevated, as shown in Fig. 1, the lower end of the brace will fit the socket and support the rest in horizontal position. I have found it convenient to incline the hinged end of the drop rest, as shown at $h^2$, so that when the same is lowered, it will not form an objectionable obstruction to the legs of the occupants of the front seat. By providing the two front rests, an operator can operate the car, with the rest in front of his seat lowered, while the other occupant or occupants of the car can utilize the couch to the full extent by elevating the adjacent front rest. It may also be here remarked that this front rest opposite the driver's seat may, in some instances, be conveniently used for other purposes, such as a seat or a support for the limbs, when required.

Manifestly, the special details of construction above described and the method of securing the back in its upright position, as well as its lower position, may be materially altered without departing from the invention. The arrangement shown, however, is one which produces a very secure back for the front seat, and a well supported and braced intermediate couch section.

Having thus described the combination, what is claimed as new and desired to be secured by Letters Patent is:—

1. In an automobile, the combination with a body, a front and a back seat, a hinged back for the front seat, a reinforcing member extending across the top portion of the hinged back, a combined truss and garment support extending outwardly from said reinforcing member, a sliding bolt carried at each end of said reinforcing member adapted to engage sockets in the body for supporting the body in a vertical position, and sockets arranged in the body slightly below the level of the back seat for engagement with the said sliding bolt for supporting the back when the same is in the horizontal position.

2. In a vehicle, the combination with a body having a back and front seat, a hinged back for the front seat capable of a movement to a horizontal or vertical position, sliding latches arranged on each side of said back and coöperating with the sides of the body for supporting the back in a vertical position, the said latches adapted to engage a member attached to the sides of the body in advance of the back seat for retaining the back in a horizontal position.

In testimony whereof I hereunto affix my signature in the presence of two witnesses.

EDWIN C. MANNING.

Witnesses:
A. H. DOANE,
F. A. BONHAM.